US000001154H

United States Statutory Invention Registration [19]

[11] Reg. Number: H1154

[43] Published: Mar. 2, 1993

Gibson et al.

[54] COVERT LIGHTING ADAPTER

[75] Inventors: David J. Gibson, Tuckerton; Paul F. Rohrbacher, Brick, both of N.J.

[73] Assignee: The United States of America as represented by the Secretary of the Army, Washington, D.C.

[21] Appl. No.: 878,190

[22] Filed: Apr. 20, 1992

[51] Int. Cl.[5] ..... F21V 9/14

[52] U.S. Cl. ..... 359/501; 359/502; 359/890; 362/19; 362/166; 42/103

[58] Field of Search ..... 359/501, 502, 890, 891; 362/19, 166

*Primary Examiner*—Bernarr E. Gregory

*Attorney, Agent, or Firm*—Michael Zelenka; William H. Anderson

[57] ABSTRACT

A Blue-Green spectral Filter and two polaroid filters are assembled within a rotating barrel assembly to both limit light source emissions to a selected light spectrum and control light intensity in order to prevent enemy night vision device detection. The rotating barrel assembly can be manufactured to attach to any type of light source. In addition, environmental protection from rain and dust is maintained through O-ring seals.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COVERT LIGHTING ADAPTER

BACKGROUND OF THE INVENTION

1. A. Field of the Invention

This invention relates to the field of Night Vision equipment and, more specifically, to a Covert Lighting Adaptor sufficiently flexible to attach to any light source to minimize user night vision device image distortion and enemy night vision device detection.

2. B. Description of Related Art

Soldiers concerned with minimizing unaided eye night vision blindness and reducing enemy threat detection presently use a standard IR Red or Blue Filter to shield their light source from an enemy using night vision equipment. Although these filters assist in eliminating user night vision blindness, they fail to reduce enemy threat detection to an acceptable level.

For example, it is well known that an enemy, using standard night vision equipment (PVS-5A and PVS-7A), can easily see an MX-991/U flashlight with Standard IR Red or Blue filters at distances significantly beyond 300 yards. Although this configuration provides adequate unaided eye night vision with negligible night vision blindness, it does not adequately protect the user from threat detection. As a result, the military urgently needs a covert flashlight that provides the same night vision capability for the user but will not be seen by either the naked eye nor any night vision equipment at a distance of 200 yards or greater.

SUMMARY OF THE INVENTION

It is an object of the present invention to provide a Covert Lighting Adaptor that reduces night vision enemy threat detection.

Another object of the present invention is to provide lighting intensity control.

It is yet another object of the present invention to provide an adaptor that maintains environmental protection for the light source.

Still another object of the invention is to prevent scattered light which increases the effectiveness of the polarizing filters.

These and other objects are accomplished in accordance with the present invention by incorporating a light spectral filter, two polarizing filters and "0" rings in conjunction with a covert rotating adaptor assembly. The light, spectral filter limits light emissions to wavelengths visible to the unaided eye. The polarizing filters and the rotating barrel assembly control light intensity. The light intensity is adjusted by rotating the barrel to position the polarizers between crossed and parallel orientations. The inside surface of the rotating barrel is light absorbing flat black or dark green to eliminate scattered light to increase the effectiveness of the polarizing filters. The "O" rings provide water-tight seals to maintain environmental protection for the light source element.

The MX-991/U flashlight utilizing a Green/Blue spectral filter was chosen as the vehicle to verify the covert lighting principal since it is the current standard military issue flashlight. This invention, however, is not limited to this configuration. Therefore, the appended claims present the only limitations of the present invention for which support is predicated on the preferred embodiment, MX-991/U, set forth in the following procedure.

DETAILED DESCRIPTION OF THE PREFERRED EMBODIMENT

Figure 1:
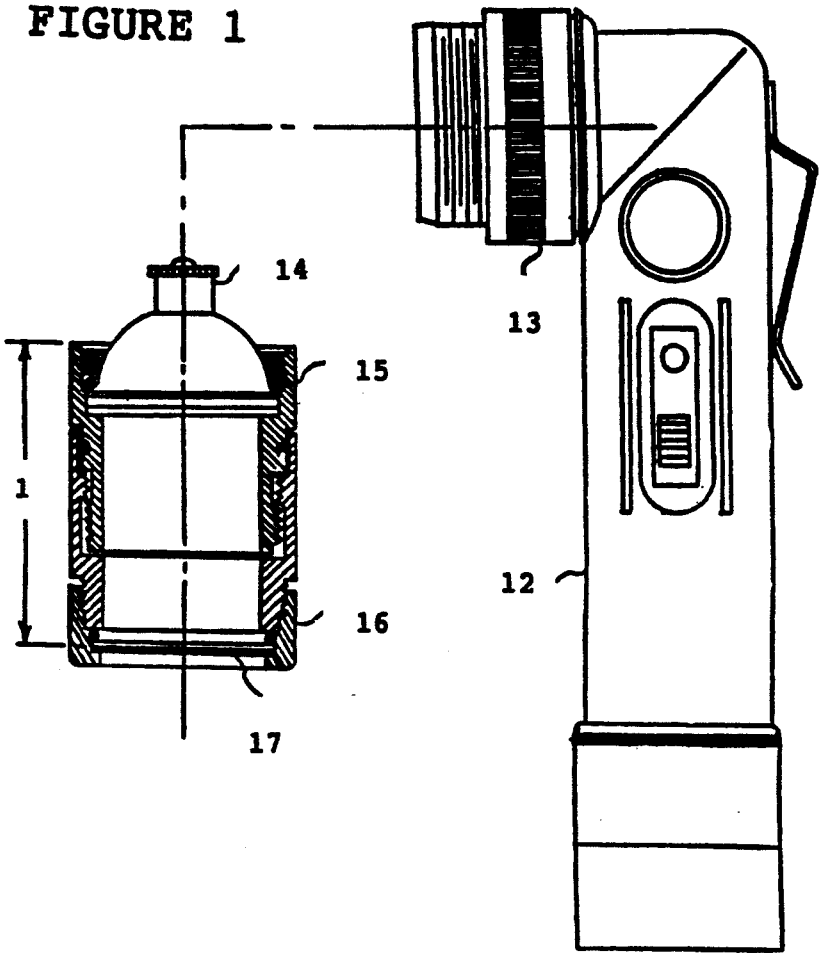
FIG. 1 is a schematic diagram of the preferred embodiment of the invention wherein the Barrel Assembly 1 screws onto the principal light source 12.
Figure 2:
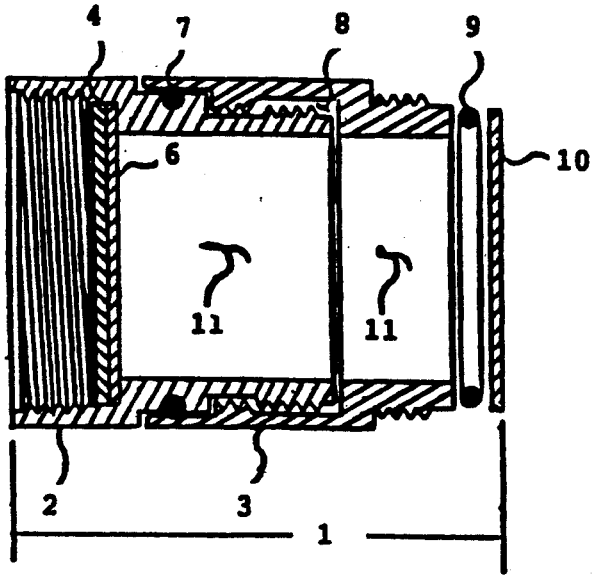
FIG. 2 shows a sectioned view of the Covert Lighting Adaptor with essential elements in place.

Referring to FIG. 1, a standard military embodiment such as the MX-991/U Flashlight is shown. Given this flashlight, remove and save the Clear Lens 17, Cap 16, the Reflector and Bulb Assembly 14 and the "O" Ring 15. Install the Green/Blue Filter (Hoffman-P/N-561-1001) directly over the Reflector and Bulb Assembly 14. Next, install one static Polarizing Filter (Polaroid Type HN 42HE) 6 positioning on top of the Green/Blue Filter 4. Remove and dispose of Barrel 13 that was p/o the flashlight, since it is not used. Place the Covert Rotating Adaptor Barrel 2 over the Reflector and Bulb Assembly 14, Green/Blue Filter 4 and Polarizing Filter 6 and screw onto the flashlight 12. Make sure the rubber "O" ring seal 15 is in place. Place "O" Ring 7 on the Covert Rotating Adaptor Barrel 2, apply Silicone Grease 8 over the male threaded portion of the Covert Rotating Adaptor Barrel 2 and the "O" Ring 7. Thread the Variable Intensity Rotator 3 on the Covert Rotating Adaptor Barrel 2 and push until it seats on the "O" Ring 7. Place the second Polarizing Filter (Hoffman—P/N-561-1001) 10 and Clear Lens 17 in the Cap 16. With the rubber "O" Ring seal 9 in place, screw the Cap 16 (with the second Polarizing Filter 10) onto the Covert Rotating Adaptor Barrel Assembly 1.

The Green/Blue Hoffman filter 4 removes all light energy except for visible light between 450 and 650 nanometers. Some night vision equipment, the PVS-7A, for example has minimum response to light in the 450–650 nanometer spectrum while the PVS-5A Goggles are sensitive to this region. Therefore, it was found that in addition to the Green/Blue Filter 4 the light intensity must be dimmable through the two Polaroid Filters, 6 and 10.

Using the physics of two linear polarizing filters 6 and 10, with the second filter 10 rotatable, the light's intensity can be controlled by the user. The second Polaroid Filter 10 is rotated by the Covert Rotating Barrel Assembly 3 to an position between crossed and parallel orientation to obtain the desired light intensity output.

The Covert Rotating Barrel Assembly 1 attaches to and seals the MX-991/U with "O" Rings 15, 7 and 9. These seals prevent dust and water penetration while "O" Ring 7 also provides friction to fix the Polarizer Lens 10 in position when the desired light intensity is obtained. In addition, the inside surface of the Rotating Barrel Assembly 1 is coated with either flat black or dark green paint 11. The internal length of the Assembly 1 is such that scattered light emissions are eliminated.

Although the above description defines the MX-991/U Flashlight configuration, the invention is designed to adapt to any type of hand-held or fixed light source, even if the head assembly is not separable (i.e.: head lights, spot lights, cockpit interior light, other style flashlights etc.).

In addition, the Covert Lighting Adaptor 1 can be modified to transmit Infrared (IR) light by simply changing the Green/Blue filter 4 to an IR emitting filter that is currently supplied with the MX-991 flashlight. This device could then function as a variable intensity beacon to friendly forces with responsive night vision equipment. As a beacon, it can be used for aircraft flight control in landing situations.

What is claimed is:

1. A lighting adaptor attached to a light source comprising:

a spectral filter capable of filtering light to a designated frequency spectrum;

a polaroid filter means for adjusting the intensity of light filtered by said spectral filter;

said polaroid filter means comprising a rotating barrel assembly and at least one static polaroid filter and at least one movable polaroid filter, both polaroid filters having a cross-polarization and parallel-alignment state;

an attachment means for securing the barrel assembly onto the light source; and an assembly sealing means for maintaining environmental protection.

2. The lighting adaptor of claim 1 wherein said spectral is blue-green.

3. The lighting adaptor of claim 1 wherein said rotating barrel controls output intensity by rotating the polaroid filters between their cross-polarization and parallel-alignment states.

4. The lighting adaptor of claim 1 wherein said rotating barrel assembly is screwed onto the light source.

5. The lighting adaptor of claim 1 wherein said rotating barrel assembly is clamped onto the light source.

6. The lighting adaptor of claim 1 wherein said rotating barrel assembly has an inside surface which is of a dark color.

7. The lighting adaptor of claim 1 wherein said sealing means comprises O-rings placed at the point of attachment between said light source and the barrel assembly.

* * * * *